Figure 1:
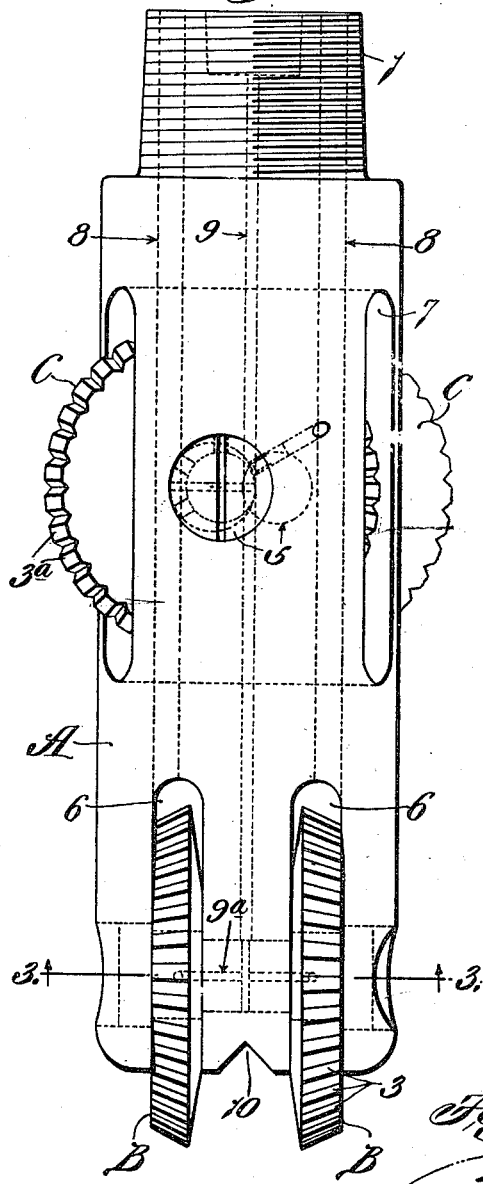

H. R. HUGHES.
REAMING DRILL.
APPLICATION FILED JULY 31, 1915.

1,176,964.

Patented Mar. 28, 1916.
2 SHEETS—SHEET 1.

Inventor,
Howard R. Hughes.
By Bakewell & Cline, Attys.

H. R. HUGHES.
REAMING DRILL.
APPLICATION FILED JULY 31, 1915.
1,176,964.
Patented Mar. 28, 1916.
2 SHEETS—SHEET 2.
Fig. 4.
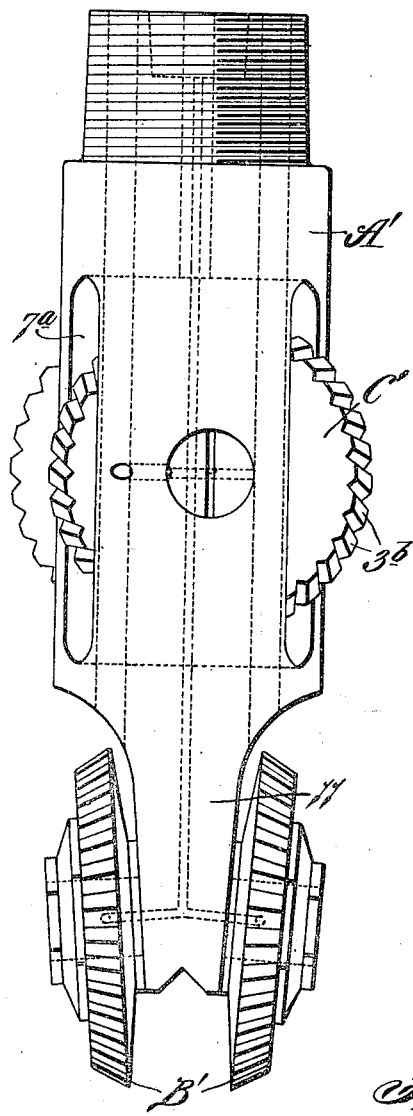
Fig. 5.
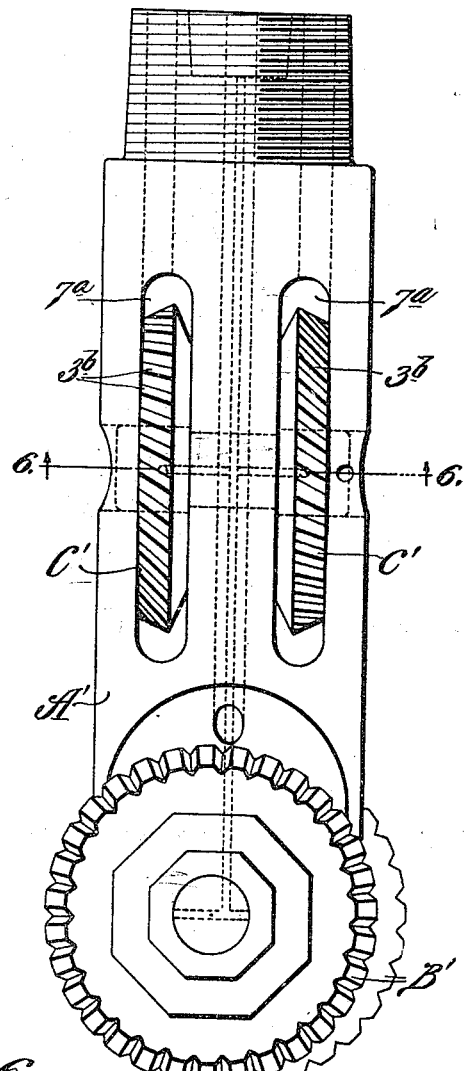
Fig. 6.
Fig. 7.
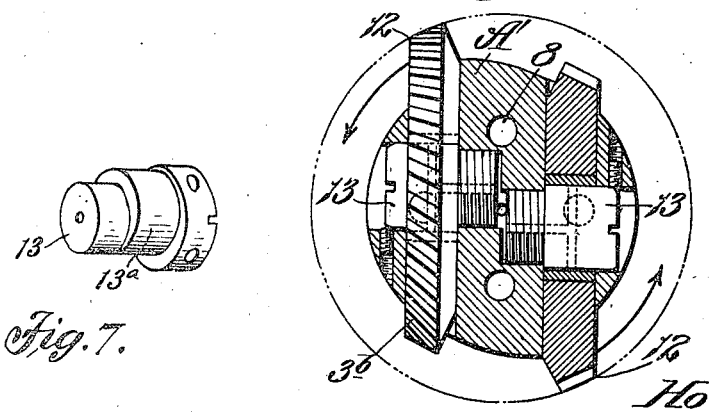
Inventor,
Howard R. Hughes.
By Bakewell Cornwall attys.

UNITED STATES PATENT OFFICE.

HOWARD R. HUGHES, OF HOUSTON, TEXAS, ASSIGNOR TO HUGHES TOOL COMPANY, OF HOUSTON, TEXAS, A CORPORATION OF TEXAS.

REAMING-DRILL.

1,176,964.  Specification of Letters Patent.  Patented Mar. 28, 1916.

Application filed July 31, 1915. Serial No. 42,931.

*To all whom it may concern:*

Be it known that I, HOWARD R. HUGHES, a citizen of the United States, residing at Houston, Harris county, Texas, have invented a certain new and useful Improvement in Reaming-Drills, of which the following is a full, clear, and exact description, such as will enable others skilled in the art to which it appertains to make and use the same.

This invention relates to rotary boring drills, and particularly to reaming drills, namely, drills of the type in which the head is provided with two separate and distinct cutting means or devices arranged in different horizontal planes, one cutting means being located at the lower end of the head so as to form the principal cutting element of the drill, and the other cutting means being located above same, or at a higher point on the head so as to maintain the clearance for the head.

One object of my present invention is to provide a reaming drill in which the means that maintains the clearance for the head is of the same character and design as the cutting means at the lower end of the head, thereby enabling the upper cutting means, which is subjected to comparatively little wear, to be interchanged with the cutting means at the lower end of the head after the same has become worn excessively.

Another object is to provide a reaming drill that is particularly adapted for use in gumbo, shale and clay and which comprises an upper cutting means that will effectively break up large chunks or shavings of the material that have been sheared off of the side wall of the hole by the cutting means at the lower end of the head, thereby causing said chunks or shavings to be dissolved by the flushing water, and thus preventing same from winding around the head or clogging the hole in such a manner as to interfere with the circulation of the flushing water or the rotary movement of the devices that constitute the cutting means of the drill.

Another object is to provide a reaming drill which comprises as a permanent part thereof a means for adjusting the cutting devices on the head, so as to compensate for wear on said cutting devices and also enable the drill to be used for boring holes of different diameters. And still another object is to provide a reaming drill that consists of a head provided at its lower end with a cutting means, and having substantially disk-shaped cutting devices arranged some distance above said cutting means and in such a manner that they effectively maintain the clearance for the drill head, by scraping off the material at the side wall of the hole.

Other objects and desirable features of my invention will be hereinafter pointed out.

Figure 2:
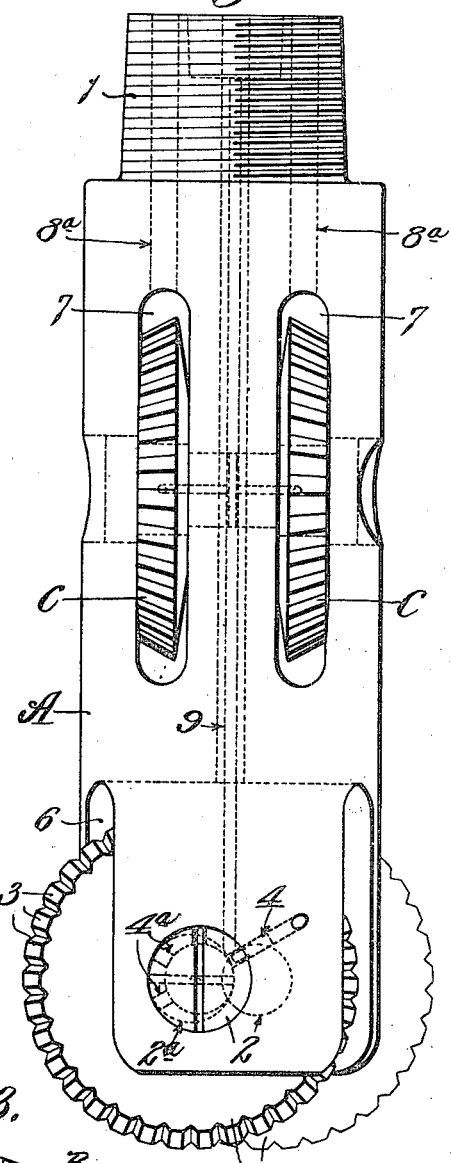
Figure 3:
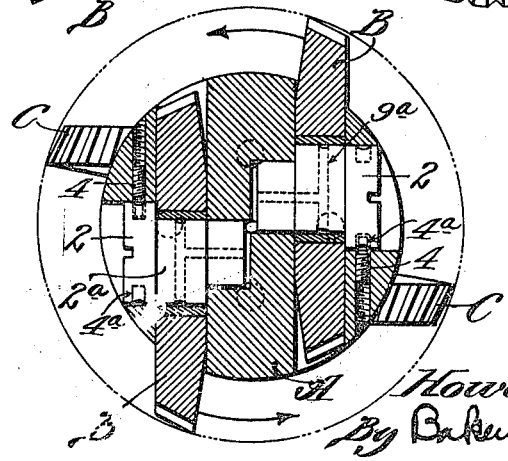

Figure 1 is a side elevational view of a reaming drill constructed in accordance with my invention. Fig. 2 is a side elevational view of the drill shown in Fig. 1, taken at right angles to Fig. 1. Fig. 3 is a horizontal-sectional view taken on the line 3—3 of Fig. 1. Figs. 4 and 5 are side elevational views, taken at right angles to each other, illustrating a slight modification of my invention; Fig. 6 is a horizontal-sectional view taken on the line 6—6 of Fig. 5; and Fig. 7 is a perspective view of one form of spindle that can be used for the cutters.

Referring to Figs. 1 to 3 of the drawings which illustrate one form of my invention, A designates the head of the drill which is provided at its upper end with an externally screw-threaded portion 1 for enabling the head to be connected to a hollow drill stem (not shown), down through which water is pumped in the usual manner to flush out the material which the drill grinds up or disintegrates. At the lower end of the head A is a cutting means which preferably consists of substantially disk-shaped cutters B that are arranged in an upright position, either vertically, or slightly inclined inwardly or outwardly. Said cutters B are rotatably mounted on spindles 2 and they are staggered or offset slightly in a horizontal plane, as shown in Fig. 3, so that the rear edge portions of same will not drag against the side wall of the hole when the advancing edges of the cutters are scraping off the material at the side wall of the hole, when the head is rotated in the direction indicated by the arrows in Fig. 3. The cutters B are preferably provided on their peripheral edges with teeth 3 that extend transversely across the edge portions of the cutters so as to disintegrate the material at the bottom of the hole and also insure the cutters turning on their axes when the drill is in operation, thereby preventing the advancing edges of the cutters from wearing flat, as would be apt to occur if the cutters did not turn or rotate when the drill is in operation.

A separate and distinct cutting means consisting of disk-shaped cutters C is arranged on the head A in a higher horizontal plane than the cutters B, so as to maintain the clearance for the drill head and also prevent the drill from veering away from a vertical line when it is operating in broken formations having crevices and containing boulders. The cutters C are of the same character and design as the cutters B at the lower end of the head, which constitute the chief cutting element of the drill. Consequently, the cutters C can be interchanged with the cutters B after the cutters B which are subjected to the greatest wear have become worn excessively. This is a very desirable feature of a reaming drill, as it makes it possible for the driller to use the drill for a long period without replacing or renewing the cutters, by simply interchanging the cutters B at the lower end of the head with the cutters C at the upper end of the head, after the cutters B have become worn to such an extent that their efficiency as the chief cutting element of the drill has been impaired, it, of course, being understood that the cutters C are provided with transversely-disposed teeth $3^a$ similar to the teeth on the cutters B. Both sets of cutters are preferably adjustably mounted on the head in such a manner that they can be adjusted inwardly and outwardly with relation to the outer surface of the head, so as to compensate for wear on the cutters and also enable the drill to be used for forming holes of various diameters, and while it is immaterial, so far as my broad idea is concerned, how the adjustment of said cutters is effected, I prefer to mount the cutters in the manner herein shown on account of the simplicity and efficiency of such a construction. As shown in Fig. 3, each of the spindles 2 on which the cutters B are rotatably mounted is provided with an eccentric portion $2^a$ that forms a bearing on which the cutter turns. The concentric portions of the spindle, which lie on opposite sides of the eccentric portion $2^a$, are journaled in the head of the drill, and consequently, when the spindle is rotated on its axis the eccentric portion $2^a$ of the spindle will cause the cutter to move inwardly or outwardly with relation to the outer surface of the head A of the drill. Any suitable means may be employed for locking the spindle in adjusted position, the means herein shown consisting of a set screw 4 in the head that is adapted to be forced into one of a plurality of recesses or holes $4^a$ in the enlarged portion or head at the outer end of the spindle. The cutters C are mounted on spindles 5 that are of the same design as the spindles 2 on which the cutters B are mounted, thereby enabling the cutters C to be adjusted inwardly or outwardly. As shown in Figs. 1 to 3, the cutters C at the upper end of the head are arranged at right angles to the cutters B, and said cutters C are also staggered or offset slightly with relation to each other in a horizontal plane so that the rear edges of same will not drag against the side wall of the hole when the drill is in operation. While it is not absolutely essential to the successful operation of my drill that the upper cutters C be arranged at right angles to the lower cutters B, still, I prefer to arrange the cutters in this manner so that the cutters C will engage the side wall of the hole at points intermediate the points where the cutters B act on the side wall of the hole, and consequently, will overcome any tendency for the drill head to veer away from a straight line when the drill is passing through formations that contain crevices or boulders. In other words, the cutters C tend to hold the drill straight when the cutters B at the lower end of the head strike against a boulder or enter a crevice which tends to deflect the drill laterally.

In the drill shown in Figs. 1 to 3 both sets of cutters are housed in the head A, the cutters B being arranged in an upright position in parallel slots 6 that extend transversely across the head and terminate in the lower end of the head, and the cutters C being arranged in parallel slots 7 that extend transversely through the head at right angles to the slots 6. By mounting the cutters in this manner I reduce to a minimum the liability of the disintegrated material packing around the cutters and I also obtain a firm bearing for the inner and outer ends of the spindles on which the cutters are mounted.

The flushing water that is pumped down the drill stem is discharged directly onto the cutters B and C, so as to dislodge any material that tends to collect on the cutters, the head A being provided with water courses 8 that lead downwardly from the upper end of same and terminate at the upper sides of the pockets in which the cutters B are arranged, and also having water courses $8^a$ that lead downwardly from the upper end of the head and terminate at the upper sides of the pockets in which the cutters C are arranged. A lubricating duct 9 that extends longitudinally through the head A, as shown in broken lines in Fig. 1, coöperates with distributing ducts $9^a$ in the cutter-supporting spindles, so as to supply a lubricating medium to the bearings on which the cutters turn. If desired, a stationary cutting means consisting of an inverted V-shaped groove 10 may be formed at the lower end of the head between the cutters B, as shown in Fig. 1, so as to progressively destroy the core at the center of the bottom of the hole.

A drill of the construction above described is particularly adapted for use in gumbo, shale and clay on account of the fact that the cutters are of such a character and are arranged on the drill head in such a manner that they form a hole by a scraping or cutting action of the edge portions of the cutters on the side wall of the hole. The upper cutters C not only maintain the clearance for the drill head and prevent the drill from deflecting from a straight line, but as they consist of substantially disk-shaped devices that project laterally from the head, they effectively break up any large chunks or shavings of material that are scraped off by the cutters B, and thus prevent long strips of material from winding around the head and interfering with the circulation of the flushing water and the rotary movement of the cutting devices. In drilling holes in clay and other soft formations with disk drills of the type now in general use it has been found that the cutting disks at the lower end of the head effectively cut the formation out of the bottom of the hole, but very frequently long strips or shavings of clay or shale wind around the head and the cutters and clog the hole to such an extent that the flushing water cannot escape from the head, thus making it necessary for the driller to "spud" by forcing the drill upwardly and downwardly rapidly. With a drill of the construction herein described there is little tendency for the material removed by the bottom cutters to wrap around the head and clog the hole, owing to the fact that the head is provided adjacent its upper end with laterally-projecting, disk-shaped cutters that have a whipping action on the material similar to the action of an egg beater, which whipping action breaks up the material into small pieces and causes it to be dissolved by the flushing water.

In Figs. 4, 5 and 6 I have illustrated another form of my invention, in which the head A' of the drill is provided at its lower end with a reduced extension 11 that carries a pair of substantially disk-shaped cutters B' that constitute the chief cutting element of the drill, said cutters B' being arranged in an upright position on opposite sides of the extension 11 and preferably staggered or offset slightly in a horizontal plane, so as to prevent the rear edge portions of same from dragging against the side wall of the hole when the drill is in operation. The cutters C' at the upper end of the head, which maintain the clearance for the head and hold the drill steady, are arranged in slots 7ª that extend transversely through the head. Said cutters C' are staggered or offset slightly with relation to each other in a horizontal plane, but they are offset oppositely to the cutters B', so that the rear edge portions of said cutters C' will drag against the side wall of the hole when the drill is in operation. The advancing edge portions of said cutters C' terminate some distance inwardly from the side wall of the hole, as shown in Fig. 6. By arranging the cutters C' in this manner, namely, so that the rear edge portions of same will drag against the side wall of the hole, I secure a relatively great degree of traction for the cutters C', and thus insure said cutters turning on their axes. When the drill is in operation the edges 12 on the cutters C' scrape off the material at the side wall of the whole in practically the same manner as the cutters C of the drill shown in Figs. 1 to 3. If desired, the cutters C' may be provided with inclined teeth 3ᵇ, as shown in Fig. 6, similar to the teeth of a beveled helical gear, so as to insure greater traction, and thus eliminate the possibility of the cutting edges 12 wearing flat, due to the failure of the cutters C' to turn or rotate on their axes. The head A' is provided with lubricating ducts and water courses similar to those in the head of the drill shown in Figs. 1 to 3, and the cutters can either be rotatably mounted on straight spindles 13, as shown in Fig. 6, or on adjustable spindles, similar to those shown in Fig. 3, provided with eccentric bearings 13ª for the cutters, as shown in Fig. 7.

Having thus described my invention, what I claim, and desire to secure by Letters Patent, is:

1. A reaming drill consisting of a head provided at its lower end with a cutting means that constitutes the chief cutting element of the drill, and a separate and distinct cutting means arranged at a higher point on the head and comprising a rotatable element arranged in an approximately upright position, both of said cutting means being of the same character and design so that they can be interchanged when the cutting means at the lower end of the head has become excessively worn.

2. A reaming drill consisting of a head provided at its lower end with rotatable cutting devices that constitute the chief cutting element of the drill, and rotatable cutting devices arranged at a higher point on the head for maintaining the clearance for the head and holding the drill steady, said upper and lower cutting devices being of the same character and design so that they can be interchanged after the cutting devices at the lower end of the head have become excessively worn and said upper devices being disposed in an approximately upright position with relation to the longitudinal axis of the head.

3. A reaming drill provided with two sets of rotatable cutting devices arranged in different horizontal planes and being of the same character and design so that they can be interchanged, the upper devices being disposed vertically and provided with cutting portions that have a scraping action on the side wall of the hole when the drill is in operation.

4. A reaming drill consisting of a head provided adjacent its lower end with a cutting means, and an approximately vertically-disposed cutting blade, mounted to revolve about a horizontal axis and projecting laterally from the head in a higher horizontal plane than that in which the cutting means at the lower end of the head lies, so as to scrape off the material at the side wall of the hole when the head revolves.

5. A reaming drill consisting of a head provided at its lower end with a cutting means, and a substantially disk-shaped cutting device arranged in an upright position at a higher point on the head in an approximately vertically-disposed slot formed in the head.

6. A reaming drill comprising two separate and distinct rotatable cutting means arranged in different horizontal planes and adapted to be interchanged, the lower one of which acts on the bottom of the hole and the upper means acting on the side wall of the hole, and an adjustable spindle for said upper cutting means provided with means for causing the position of said upper cutting means to be changed when said spindle is turned.

7. A reaming drill comprising a head provided with a lower and an upper rotatable cutting means that are adapted to be interchanged, and an adjustable supporting means for said upper cutting means rotatably mounted in the head and having said upper cutting means revolubly mounted thereon.

8. A reaming drill comprising a head provided adjacent its lower end with a cutting means, a substantially disk-shaped cutting device arranged in an approximately upright position on said head in a higher horizontal plane than said cutting means and projecting laterally from the head so that the edge portion of same will remove the material from the side wall of the hole when the head is revolved, and a supporting element on which said cutting device is rotatably mounted, said element having means that causes said cutting device to move inwardly or outwardly with relation to the outer surface of the head when said supporting element is turned about its longitudinal axis.

9. A reaming drill comprising a head provided adjacent its lower end with a cutting means, a substantially disk-shaped cutting device arranged in an approximately upright position on said head in a higher horizontal plane than said cutting means and projecting laterally from the head so that the edge portion of same will remove the material from the side wall of the hole when the head revolves, and an adjustable spindle rotatably mounted on the head and provided with a portion arranged eccentric with respect to the axis of the spindle to form a bearing on which said cutting device turns.

10. A reaming drill consisting of a head provided adjacent its lower end with a cutting means, and a plurality of substantially disk-shaped cutters arranged in an approximately vertical position on said head above said cutting means and mounted to revolve about horizontal axes, said cutters projecting laterally in opposite directions from the side face of the head and being provided with cutting portions that have a scraping action on the side wall of the hole when the drill is in operation.

11. A reaming drill consisting of a head provided adjacent its lower end with a cutting means, and a plurality of substantially disk-shaped cutters arranged in an upright position at a higher point on said head than the plane in which said cutting means lies and staggered slightly with relation to each other.

12. A rotary boring drill comprising a head provided adjacent its lower end with a cutting means, said head having approximately vertically-disposed openings that lie in a higher horizontal plane than the plane in which said cutting means lies, which openings extend transversely through the head, and substantially disk-shaped cutters in said openings that project laterally in opposite directions from the head and provided with portions that scrape off the material from the side wall of the hole.

13. A reaming drill consisting of a head provided adjacent its lower end with a cutting means, and a substantially disk-shaped cutter rotatably mounted on said head above said cutting means and in such a manner that the rear edge portion of same will drag against the side wall of the hole when the drill is in operation.

14. A reaming drill consisting of a head provided adjacent its lower end with a cutting means, and a substantially disk-shaped cutter rotatably mounted on said head above said cutting means and in such a manner that the rear edge portion of same will drag against the side wall of the hole when the drill is in operation, said cutter being provided on its peripheral edge with inclined teeth that extend transversely of the cutter.

15. A reaming drill consisting of a head provided adjacent its lower end with a cutting means, and a plurality of substantially disk-shaped cutters rotatably mounted on said head in an upright position at a point above said cutting means and projecting laterally from the head in such directions 16. A reaming drill comprising a head provided adjacent its lower end with a cutting means, and a substantially disk-shaped cutter on said head that is arranged in a higher horizontal plane than the plane in which said cutting means lies, said cutter being so positioned that the lead side of same is spaced away from the side wall of the hole and the rear edge position of same will drag against the side wall of the hole when the drill is in operation.

17. A reaming drill comprising a head provided adjacent its lower end with a cutting means, a substantially disk-shaped cutter on said head that is arranged in a higher horizontal plane than the plane in which said cutting means lies, said cutter being so positioned that the lead side of same is spaced away from the side wall of the hole and the rear edge portion of same will drag against the side wall of the hole when the drill is in operation, and means on said cutter that insures said cutter turning on its axis when the drill is in operation.

18. A reaming drill consisting of a head provided adjacent its lower end with a cutting means, a pair of substantially disk-shaped cutters partially housed in said head and arranged in an upright position and in parallel relation to each other in a higher horizontal plane than the plane in which said cutting means lies, and horizontally-disposed spindles in the head provided with eccentric portions on which said cutters turn, said cutters being slightly offset with relation to each other.

In testimony whereof I hereunto affix my signature in the presence of two witnesses, this 19th day of July, 1915.

HOWARD R. HUGHES.

Witnesses:
LAURA KELLEY,
CATHERINE HARRINGTON.